United States Patent [19]

Tsuji et al.

[11] Patent Number: 4,583,124
[45] Date of Patent: Apr. 15, 1986

[54] FACSIMILE COMMUNICATION CONTROL SYSTEM

[75] Inventors: Makoto Tsuji, Sagamihara; Yuichi Saito, Hatano, both of Japan

[73] Assignee: Ricoh Company, Ltd., Tokyo, Japan

[21] Appl. No.: 619,761

[22] Filed: Jun. 12, 1984

[30] Foreign Application Priority Data

Jun. 30, 1983 [JP] Japan ................................. 58-117121

[51] Int. Cl.⁴ ............................................. H04N 1/32
[52] U.S. Cl. .................................... 358/256; 358/257; 179/2 DP
[58] Field of Search ...................... 358/256, 257, 286; 375/121; 179/2 DP, 2 R; 370/84

[56] References Cited

U.S. PATENT DOCUMENTS

| 4,153,916 | 5/1979 | Miwa et al. | 358/257 |
| 4,494,149 | 1/1985 | Furukawa | 358/257 |
| 4,532,379 | 7/1985 | Tsukioka | 179/2 R |

Primary Examiner—James J. Groody
Assistant Examiner—John K. Peng
Attorney, Agent, or Firm—David G. Alexander

[57] ABSTRACT

A facsimile communication control system for setting up a modem rate appropriate for a remote receiving station within a short period of time. A modem rate used for communication last time is stored in a nonvolatile memory so that a modem training at the time of the next communication begins with the stored modem rate. Where the transmit station is to hold a communication with a new remote station for the first time, the modem training begins with the highest modem rate which is shared by the two stations as heretofore practiced.

7 Claims, 4 Drawing Figures

4,583,124

FACSIMILE COMMUNICATION CONTROL SYSTEM

BACKGROUND OF THE INVENTION

The present invention relates to a facsimile communication control system which desirably sets up a modem rate for two remote transceivers to hold facsimile communication.

Generally, in facsimile, function setting based on a protocol is performed according to the premessage procedure in phase B in the facsimile transmission procedure which is prescribed in the CCITT standards. In order to start transmission at a modem rate which is acceptable for the transmission of picture signals, it has been customary to set the highest modem rate which is shared by remote facsimile transceivers at transmit and receive stations, then check line conditions by a modem training, and then sequentially shift down the modem rate if the line conditions are not good.

In some geographical areas, however, line conditions are constantly poor so that facsimile transceivers there cannot receive picture signals but at low modem rates. Should the modem rate be sequentially shifted down from the highest one even for communication with such a transceiver, modem training would have to be repeated a number of times wastefuly prolonging communication time.

SUMMARY OF THE INVENTION

It is therefore an object of the present invention to provide a facsimile communication control system which eliminates the wasteful repetition of modem training and allows an appropriate modem rate matching with a receive station to be set up within a short period of time.

It is another object of the present invention to provide a generally improved facsimile communication control system.

A facsimile communication control system having a modem and setting up a modem rate which matches with a remote receive station of the present invention comprises a store having an area for filing a number dialed to hold a communication with the remote station and an area for filing a modem rate set up at the time of the communication, and a control for controlling the modem and the store such that when a communication is to be held next time with the remote station, the filed modem rate is read out and, then, a modem training is initiated with the modem rate.

In accordance with the present invention, a facsimile communication control system sets up a modem rate appropriate for a remote receiving station within a short period of time. A modem rate used for communication last time is stored in a nonvolatile memory so that a modem training at the time of the next communication begins with the stored modem rate. Where the transmit station is to hold a communication with a new remote station for the first time, the modem training begins with the highest modem rate which is shared by the two stations as heretofore practiced.

The above and other objects, features and advantages of the present invention will become apparent from the following detailed description taken with the accompanying drawings.

DESCRIPTION OF THE PREFERRED EMBODIMENT

While the facsimile communication control system of the present invention is susceptible of numerous physical embodiments, depending upon the environment and requirements of use, a substantial number of the herein shown and described embodiment have been made, tested and used, and all have performed in an eminently satisfactory manner.

To facilitate understanding of the present invention, a brief reference will be made to a facsimile communication procedure, mainly transmission from a transmit or calling station in phase B, in accordance with a prior art system, shown in FIG. 1.

Figure 1:
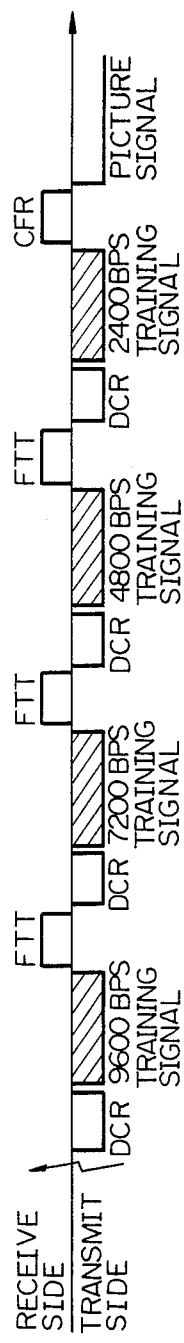
FIG. 1 is a diagram showing a facsimile communication procedure in accordance with a prior art system.

In FIG. 1, a tránsmit or calling station identifies a functions particular to a receive or called station upon receipt of a digital identification signal (DIS) and, then, sends a digital command signal (DCS) to the receive station in order to set up the highest modem rate, 9,600 BPS, which the two stations share. Thereafter, the transmit station transmits a training signal to the receive station using a 9,600 BPS modem. In response to the training signal, the receive station performs phase adjustment and modem training and, if successfully received a standard signal, returns a confirmation-to-receive (CFR) signal to the transmit station while, if failed to do so, returns a failure-to-train (FTT) signal to request retraining. Upon receipt of the FTT signal, the transmit station lowers the modem rate one step to set up 7,200 BPS and sends another DCS.

When the line conditions are poor, the above procedure is repeated to sequentially shift down the modem rate to one at which a modem training would succeed, e.g. 2,400 BPS. The communication time comsumed by such a procedure is wasteful.

In accordance with a characteristic feature of the present invention, a modem rate used last time for communication is stored in a nonvolatile memory so that communication may start with the stored modem rate next time.

Figure 2:
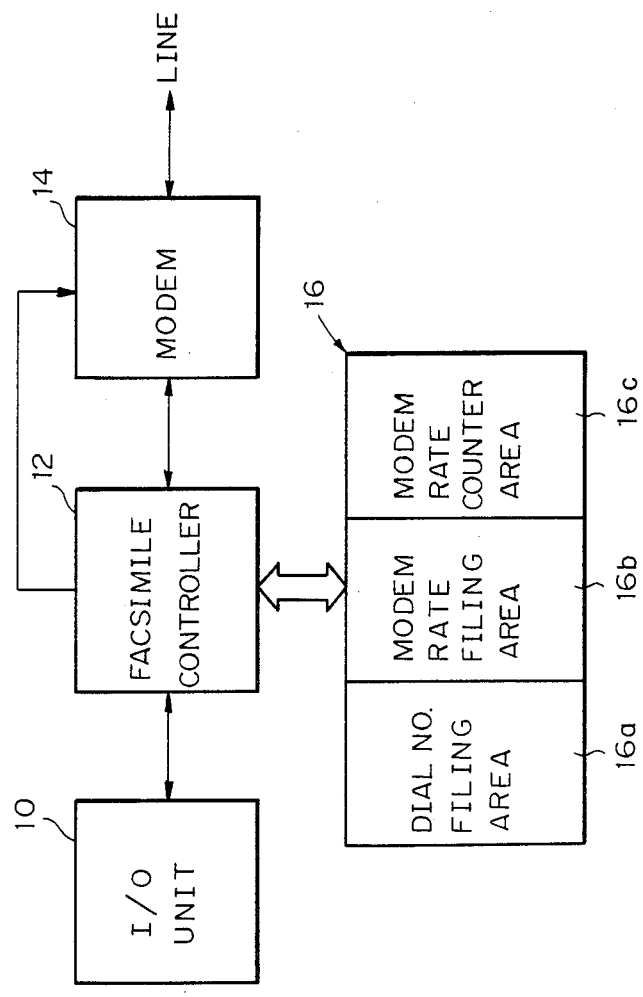
FIG. 2 is a block diagram showing an essential part of a facsimile communication control system embodying the present invention.

Referring to FIG. 2, a facsimile transceiver in accordance with one embodiment of the present invention is shown. The transceiver includes an input/output (I/O) unit 10 which delivers picture signals to and receives them from a facsimile control unit 12. While the I/O unit 10 comprises a scanner and a printer in this particular embodiment, it is only illustrative and may be replaced by a picture signal store device of the like. The facsimile control unit, or controller, 12 is made up of a microcomputer or microcomputers. In a transmit mode operation, the controller 12 encodes picture signals output from the I/O unit 10 and delivers the encoded signals to a modem 14 while, in a receive mode operation, it decodes received signals output from the modem 14 to deliver them to the I/O unit 10. The controller 12 also performs other necessary controls by exchanging control information with the other transceiver, e.g. setting up a line density and a modem rate. Stated another way, the controller 12 totally controls the operation of the whole transceiver.

A part of a store, designated by the reference numeral 16, is used by the controller 12 and has an area 16a for filing a dial number assigned to a remote facsimile transceiver, an area 16b for filing a modem rate which was set up when the own transceiver held communications with the remote transceiver, and an area 16c for counting successful communications completed at the filed modem rate. The store 16 comprises a rewritable nonvolatile memory which may be an EPP ROM or a battery backed-up RAM.

Figure 3:
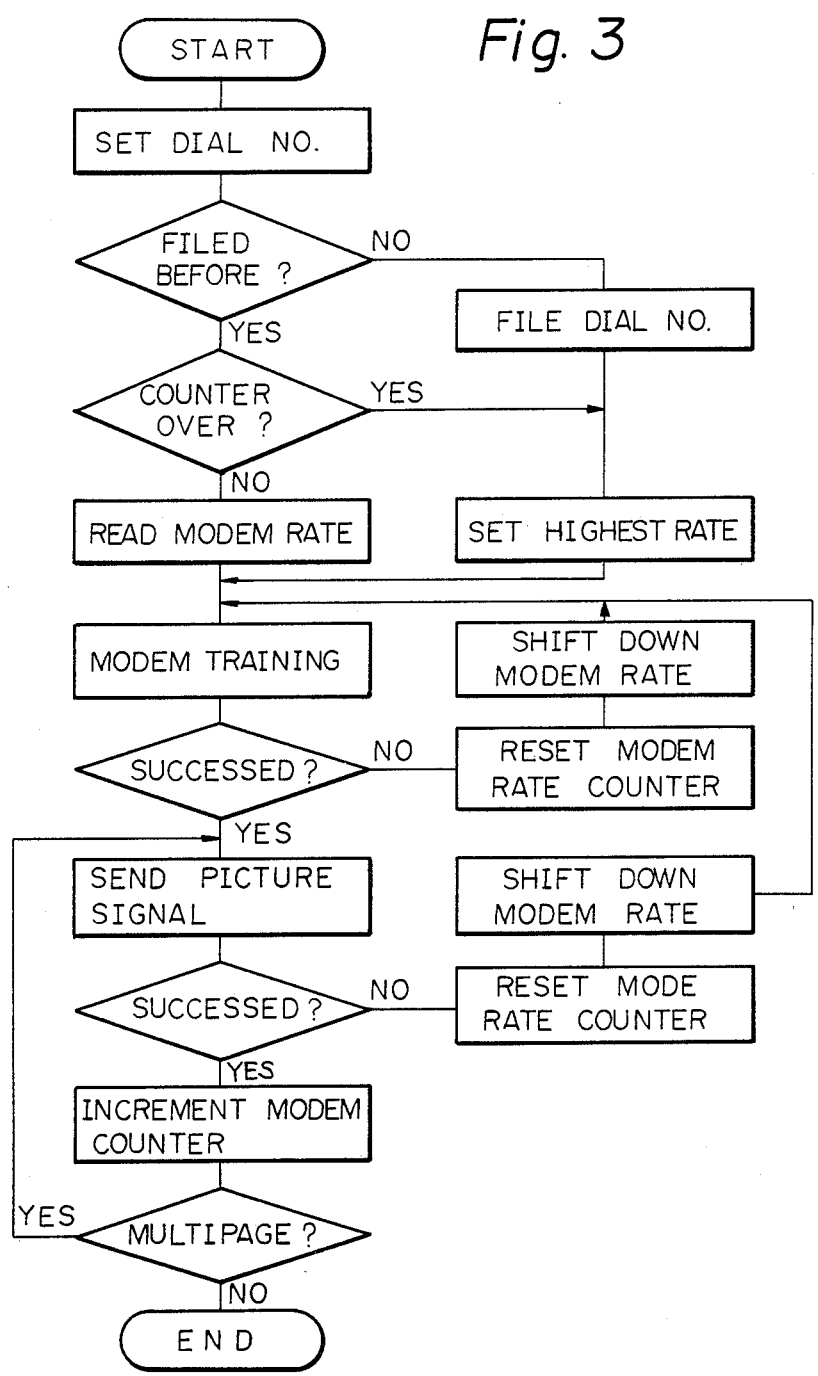
FIG. 3 is a flowchart demonstrating the operation of the system shown in FIG. 2.

When the facsimile transceiver having the above construction is operated to enter into communication with a remote transceiver, the number dialed to call the remote transceiver and a modem rate selected for the communication are filed in the store 16 for future communications. That is, when one dials a remote transceiver by a telephone (not shown), the controller 12 senses it and, as shown in the flowchart of FIG. 3, sees if the dial number of the remote transceiver has already been filed in the dial number filing area 16a of the store 16. If the dial number is not found in the area 16a and needs be filed, the controller 12 files it in the area 16a and loads the highest modem rate in a corresponding address of the modem rate filing area 16b.

Where the dial number mentioned above has already been filed, the controller 12 checks the content of a counter in a corresponding address of the modem rate counter area 16c so as to see if it has exceeded a predetermined number; if exceeded, the controller 12 replaces a modem rate stored in a corresponding address of the modem rate filing area 16b with the highest modem rate for the reason which will be described and, if not exceeded, it reads a corresponding modem rate out of the modem rate filing area 16b.

In the manner described, the control system in the illustrative embodiment is such that, when the transceiver is to enter into communication with a new remote transceiver for the first time, the highest modem rate shared by them is set up as has been the case with the prior art system, while where it has previously experienced communication with the remote transceiver, a modem rate set up for the last communication is read out of the modem rate filing area 16b to begin a modem training at that modem rate.

That is, where the remote transceiver is in a location which constantly suffers from poor line conditions, a low modem rate will have been filed in the modem rate filing area 16b and the training will be initiated with the filed low modem rate. Such eliminates a wasteful part of the communication processings in which the operation starts with the highest modem rate and repeats failure-to-train until a communicatable modem rate is reached.

When the modem training has succeeded, picture signals are sent out next. When is has failed, on the other hand, the modem rate counter is set to lower the modem rate one step. The lower modem rate is filed again in the modem rate filing area 16b and loaded in the modem 14, followed by another modem training.

When the transceiver at the receive station has received one page of picture signals in a good condition after the success of the modem training, the transceiver at the transmit station increments the modem rate counter by 1 (one). If any other document to be transmitted is left at the transmit station, it will be continuously transmitted at the same modem rate. When the receipt condition at the receive station has been faulty, the transmit station resets the modem counter, shifts down the modem rate, and repeats the above-described procedure starting with a modem training.

The modem rate counter counts up successful procedures from modem training to transmission of picture signals. When the number of such successful procedures has exceeded predetermined one, the modem rate then in use is reevaluated. That is, since maintaining a low modem rate which was set up due to temporary poor line conditions results in a poor transmission efficiency, an arrangement is made such that after some consecutive times of success of communication the counter becomes over so that the highest modem rate will be restored at time of next communication and onward. Meanwhile, when communication with that modem rate has failed before the counter becomes over, the modem rate counter is reset. Such a procedure promotes the efficiency of transmission processings.

Figure 4:
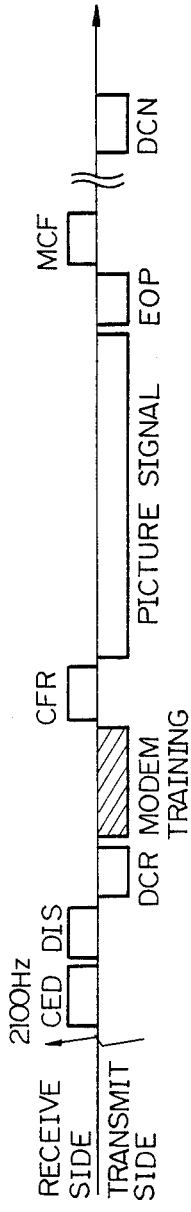
FIG. 4 is a diagram representative of a facsimile communication procedure in accordance with the system shown in FIG. 2.

Referring to FIG. 4, there is shown a communication held in accordance with the present invention between the own station and a remote station which is located in a poorly conditioned area. Comparing FIG. 4 with FIG. 1 which represents a prior art system, it will be seen that the illustrative embodiment of the present invention is capable of transmitting picture signals after a single modem training and, thereby, remarkably shortening the premessage processing time.

While the particular embodiment shown and described is constructed to restore the highest modem rate at the time of counter-over after consecutive successes of communication, the modem rate may alternatively be shifted one step every time a communication succeeds.

In the embodiment, when the modem training or the transmission of picture signals (i.e. receipt of picture signals at a receiving station) has failed, the modem rate counter is reset to see the frequency of consecutive successful communications so as to reevaluate a modem rate. In an alternative arrangement, the modem rate counter may be decremented by 1 (one) upon a failure so that the modem rate then existing is varied in accordance with an average frequency of successful communications.

Furthermore, although the illustrative embodiment is designed to reevaluate a modem rate at the beginning of a communication, the reevaluation may be effected after the transmission of every page in the case of multipage transmission or the like.

In summary, it will be seen that the present invention provides a facsimile communication control system which shortens a processing time required for setting up a modem rate at the time of communication.

Various modifications will become possible for those skilled in the art after receiving the teachings of the present disclosure without departing from the scope thereof.

What is claimed is:

1. A facsimile communication control system having a modem and setting up a modem rate which matches with a remote receive station, comprising:
   (a) store means having an area for filing a number dialed to hold a communication with the remote station and an area for filing a modem rate set up at the time of said communication; and
   (b) control means for controlling said modem and said store means such that when a communication is to be held next time with the remote station, the filed modem rate is read out and, then, a modem training is initiated with said modem rate.

2. A facsimile communication control system as claimed in claim 1, in which the store means further comprises an area for filing the number of successes of communication which occur at said modem rate, the control means being constructed to control the modem and the store means such that the filed modem rate is altered when the filed number of successes of communication reaches a predetermined number.

3. A facsimile communication control system as claimed in claim 1, in which the store means further comprises an area for filing the number of successes of communication which occur at said modem rate, the control means being constructed to control the modem and the store means such that the filed modem rate is changed to a highest rate when the filed number of successes of communication reaches a predetermined number.

4. A facsimile communication control system as claimed in claim 1, in which the store means further comprises an area for filing the frequency of success of communication which occurs at said modem rate, the control means being constructed to control the modem and the store means such that the filed modem rate is shifted up one step every time a communication with the remote station succeeds.

5. A facsimile communication control system as claimed in claim 1, in which the store means comprises a rewritable nonvolatile memory.

6. A facsimile communication control system as claimed in claim 5, in which the nonvolatile memory comprises an EEP ROM.

7. A facsimile communication control system as claimed in claim 5, in which the nonvolatile memory comprises a battery backed-up RAM.

* * * * *